(12) United States Patent
Zhang et al.

(10) Patent No.: US 7,899,711 B2
(45) Date of Patent: Mar. 1, 2011

(54) COMPUTER-IMPLEMENTED METHOD FOR ESTIMATING BIDDER VALUATION

(75) Inventors: Bin Zhang, Fremont, CA (US); Kemal Guler, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3245 days.

(21) Appl. No.: 10/279,805

(22) Filed: Oct. 23, 2002

(65) Prior Publication Data

US 2004/0083155 A1   Apr. 29, 2004

(51) Int. Cl.
  *G06Q 40/00* (2006.01)
(52) U.S. Cl. ............................................. 705/26; 705/10
(58) Field of Classification Search .................... 705/26, 705/7, 53
See application file for complete search history.

(56) References Cited

U.S. PATENT DOCUMENTS

| 2003/0033194 A1* | 2/2003 | Ferguson et al. | ............... 705/10 |
| 2003/0078850 A1* | 4/2003 | Hartman et al. | ............... 705/26 |
| 2004/0054630 A1* | 3/2004 | Ginter et al. | ..................... 705/53 |

OTHER PUBLICATIONS

David J. Kappos, Subject Matter Eligibility of Computer Readable Media, Notice of the Director, Jan. 26, 2010, USPTO.*

* cited by examiner

*Primary Examiner* — Charles Kyle
*Assistant Examiner* — Siegfried E. Chencinski

(57) ABSTRACT

A computer-implemented method for estimating bidder valuation. A probability that a bid of a first bidder in an auction is not greater than a first value is determined, wherein a second bidder has a valuation in the auction equal to a second value. A rate at which the probability changes is determined. The ratio of the probability to the rate of change is determined. The ratio is added to the rival bid to determine an estimate of the first bidder's valuation.

23 Claims, 3 Drawing Sheets

COMPUTER-IMPLEMENTED METHOD FOR ESTIMATING BIDDER VALUATION

FIELD OF INVENTION

Various embodiments of the present invention relate to the field of auction design and analysis.

BACKGROUND OF THE INVENTION

An auctioneer typically has to make a number of decisions when designing an auction. Similarly, a bidder participating in an auction must also make a number of decisions when determining a bid. In order to assist an auctioneer or a bidder in making their respective decisions, various tools have been developed for analyzing a particular market environment. One set of tools provides for estimating bidder's valuations for an auctioned object based on historical bids. The theory of Affiliated Private Value (APV) auction models is one of these tools.

In some prior art methods, it is assumed that there is no asymmetry across different segments of bidders. These unnecessary assumptions limit the applicability if the model to a limited number of specific auction environments. Since most auctions comprise asymmetries among bidder segments, this theory is limited in accurate applicability.

One prior art method for an asymmetric model requires K+1 dimensional kernel estimation, where K is the number of asymmetric bidder segments. Even with just two asymmetric bidder segments, at least 3-dimensional kernel estimation has to be used. As the dimensionality goes up, kernel density method requires much more number of data samples to achieve the same quality (variance) of estimation. As such, this method requires substantial computation. Table 1 illustrates how the rate of the number of samples required increases as the dimensionality becomes higher.

TABLE 1

| Dimensionality | Number of Samples |
|---|---|
| 1 | 4 |
| 2 | 19 |
| 3 | 67 |
| 4 | 223 |
| 7 | 10700 |
| 10 | 842000 |

As shown in Table 1, a very large number of data samples is required to produce an accurate estimation of bid valuation. For just two types of asymmetric bidders, the current method requires 67 samples. For three types of asymmetric bidders, the current method requires 223 samples. Often, auctions comprise relatively few participants and occur infrequently. As such, it may not be possible to obtain enough data samples from historical bid data to obtain the estimation of bid valuation.

Current methods for determining bidders' valuations for an auctioned object based on historical bid data have substantial drawbacks. One class of methods requires the use of broad assumptions to determine the bidders' valuations, thus limiting the applicability and reliability of the results. Furthermore, other methods require substantial data and heavy computation to determine the bidders' valuations. The amount of data required is typically not available, limiting the usefulness of this method.

SUMMARY OF THE INVENTION

Various embodiments of the present invention, a computer-implemented method for estimating bidder valuation, are presented. A probability that a bid of a first bidder in an auction is not greater than a first value is determined, wherein a second bidder has a valuation in the auction equal to a second value. A rate at which the probability changes is determined. The ratio of the probability to the rate of change is determined. The ratio is added to the rival bid to determine an estimate of the first bidder's valuation.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE(S) FOR CARRYING OUT THE INVENTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a computer-implemented method for estimating bidder valuation, are described herein. In one embodiment, the present invention provides a method for estimating a bidder's valuation of an auctioned object based on historical bids recorded from similar auctions. The present invention utilizes kernel estimation in two-dimensional space, regardless of the number of bidder segments and whether the bidder segments are symmetrical or asymmetrical. The estimated value distributions may be used in bidding decisions in designing and auction (e.g., deciding configuration of auction parameters such as format and reserve price) and/or determining a bidding strategy for a bidder.

It should be appreciated that embodiments of the present invention are applicable to all auction formats (e.g., forward auctions and procurement auctions). For purposes of the present application, examples are given for the instance of a forward auction. Someone with average skill in the art can make the appropriate modifications of the described embodiments for use in a procurement auction. For example, in the case of a supplier bidding to sell an item, the phrase "determining a probability that a bid of a first bidder in an auction is not greater than a first value" should be replaced with "determining a probability that a bid of a first bidder in an auction is not less than a first value".

Figure 1:
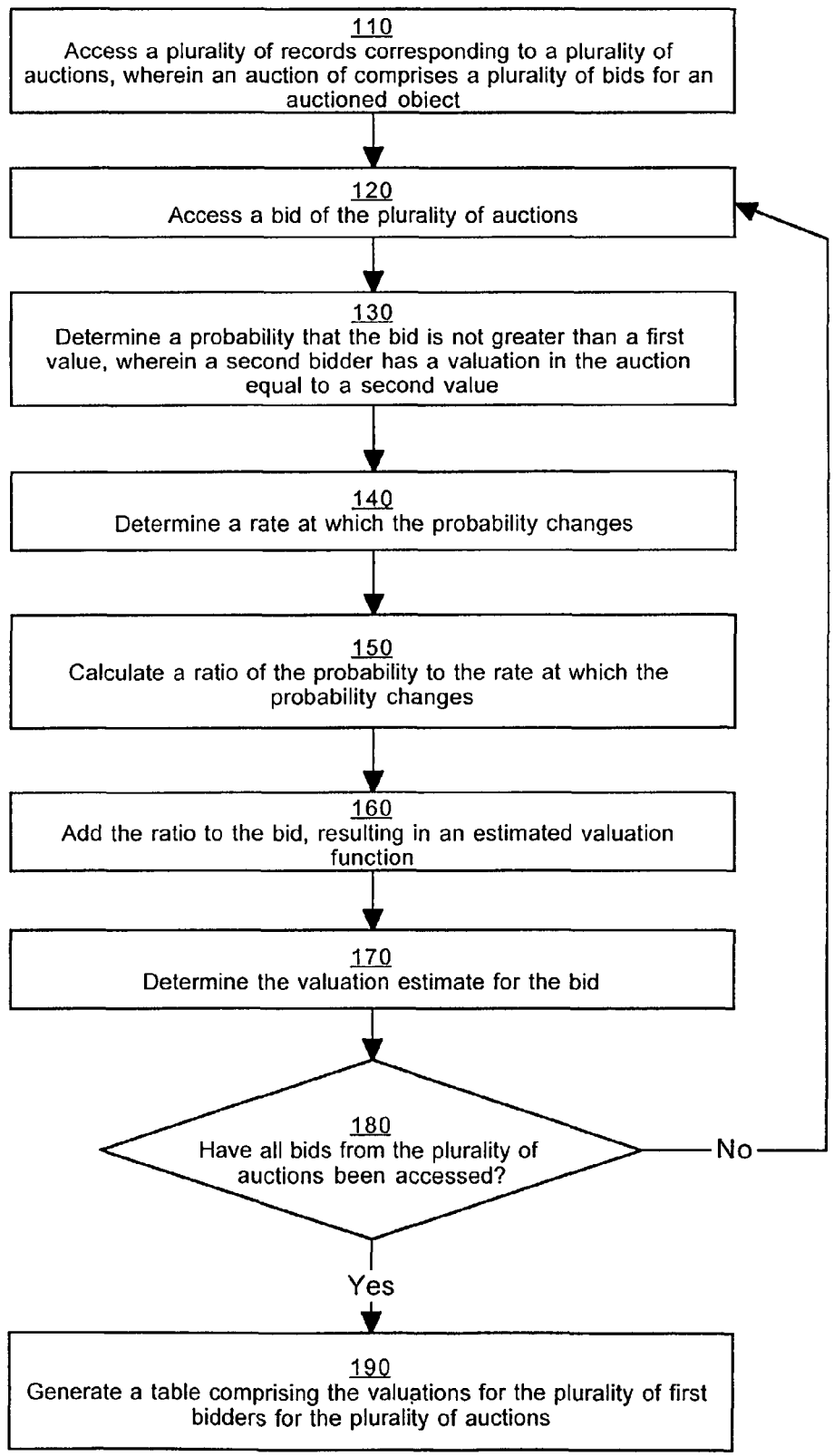
FIG. 1 is a flow chart illustrating steps in a process for estimating bidder valuation in accordance with one embodiment of the present invention.

FIG. 1 is a flow chart illustrating steps in a process for estimating bidder valuation in accordance with one embodiment of the present invention. In one embodiment, process 100 is carried out by processors and electrical components under the control of computer readable and computer executable instructions. Although specific steps are disclosed in process 100, such steps are exemplary. That is, the embodiments of the present invention are well suited to performing various other steps or variations of the steps recited in FIG. 1.

At step 110, a plurality of records are accessed, wherein the records correspond to a plurality of auctions. An auction record comprises data corresponding to bids from rival bidders (e.g., first bidders). It should be appreciated that there may be any number of records, wherein the records may comprise any number of rival bids. In one embodiment, the plurality of records is historical bid data from past auctions for a same or similar object(s). In one embodiment, the auctioned item is a single and divisible item auctioned to n risk-neutral bidders.

Figure 2:
FIG. 2 is a diagram of an exemplary table of joint bid distribution historical bid data in accordance with one embodiment of the present invention.

FIG. 2 is a diagram of an exemplary joint bid distribution 200 of historical bid data in accordance with one embodiment of the present invention. Joint bid distribution 200 is a table of historical bids in a plurality of auctions (l) 210 for bidders (i) 220. It should be appreciated that joint bid distribution 200 may comprise bids for any number of auctions 210 (e.g., from 1 to L) and any number of bidders 220 (e.g., from 1 to n). Bid 230 represents a single rival bid in accordance with one embodiment of the present invention. It should be appreciated that the values for the bids shown in joint bid distribution 200 are exemplary. Furthermore, it should be appreciated that a joint bid distribution may be presented or received in another statistical format, such as a bar chart or scattergram.

With reference to FIG. 1, at step 120, a bid of the plurality of records is accessed. In one embodiment, the first rival bid is accessed. In one embodiment, each rival bid of the plurality of auctions is accessed, one at a time, for transformation to an estimated valuation.

At step 130, a probability that the rival bid is not greater than a first value is determined, wherein the bidder (e.g., a second bidder) has a valuation in the auction equal to a second value. In one embodiment, the first value represents the highest rival bid for the auctioned object and the second value represents the bidder's valuation for the auctioned object. The first value and the second value may be any positive number. It should be appreciated that the bid data of the plurality of records will indicate appropriate ranges for the first value and the second value.

In one embodiment, the first value corresponding to a rival bid and a second value corresponding to a bidder valuation are user-generated inputs. Given the second value, the probability that the highest rival bid is not greater than the first value is determined. For example, if the bidder valuation for an object is fifty dollars, the probability that the highest rival bid is not greater than seventy-five dollars is determined. Similarly, if the bidder valuation for an object is fifty dollars, the probability that the highest rival bid is not greater than twenty-five dollars is determined.

$$\hat{G}_{B_i,b_i}(B, b) = \frac{1}{L_n h_G} \sum_{l=1}^{L_n} 1(B_{i,l} \le B) K_G\left(\frac{b - b_{i,l}}{h_G}\right) \quad \text{Equation 1}$$

In one embodiment, the probability is determined according to Equation 1, wherein B represents the first value, b represents the second value, i represents a particular bidder, l represents a particular auction of the plurality of auctions, $L_n$ represents the total number of auctions comprising n bidders, $h_G$ represents a first bandwidth, and $K_G$ represents a one-dimensional kernel. It should be appreciated that the first bandwidth can be selected using standard mathematical techniques and that the one-dimensional kernel can be selected from the standard set of non-parametric kernel functions.

At step 140, a rate at which the probability changes is determined. In one embodiment, the rate at which the probability changes is determined by taking the derivative of the probability.

$$\hat{g}_{B_i,b_i}(B, b) = \frac{1}{L_n h_g^2} \sum_{l=1}^{L_n} K_g\left(\frac{B - B_{i,l}}{h_g}, \frac{b - b_{i,l}}{h_g}\right) \quad \text{Equation 2}$$

In one embodiment, the rate at which the probability changes is determined according to Equation 2, wherein B represents the first value, b represents the second value, i represents a particular bidder, l represents a particular auction of the plurality of auctions, $L_n$ represents the total number of auctions comprising n bidders, $h_g$ represents a second bandwidth, and $K_g$ represents a two-dimensional kernel. It should be appreciated that the second bandwidth can be selected using standard mathematical techniques and that the two-dimensional kernel can be selected from the standard set of non-parametric kernel functions. Furthermore, it should be appreciated that only a two-dimensional kernel estimation is required, regardless of the number of asymmetric rival bidders.

At step 150, the ratio of the probability to the rate at which the probability changes is calculated.

$$\frac{\hat{G}_{B_i|b_i}(b|b)}{\hat{g}_{B_i|b_i}(b|b)} \quad \text{Equation 3}$$

In one embodiment, the ratio of the probability to the rate of change of the probability is determined according to Equation 3, b represents the bid amount, wherein $\hat{G}_{B_i|b_i}(b|b)$ represents the probability that the highest rival bid is less than the bid amount b, and wherein $\hat{g}_{B_i|b_i}(b|b)$ represents the rate at which the probability changes.

At step 160, the ratio is added to the bid, resulting in a value estimation function for bidder i.

$$E_i(b) = b + \frac{\hat{G}_{B_i|b_i}(b|b)}{\hat{g}_{B_i|b_i}(b|b)} \quad \text{Equation 4}$$

In one embodiment, the bid valuation for a rival bid is determined according to Equation 4, wherein $E_i(b)$ represents a value estimate for bidder i, b represents the bid amount, $\hat{G}_{B_i|b_i}(b|b)$ represents the probability that the highest rival bid is less than the bid amount b, and wherein $\hat{g}_{B_i|b_i}(b|b)$ represents the rate of change of the probability.

At step 170, bidder i's valuation estimate for auction l is determined by evaluating the value estimation function at the bid amount submitted by bidder i in auction l.

$$v_{il} = E_i(b_{il}) \quad \text{Equation 5}$$

In one embodiment, bidder i's estimated valuation for auction l is determined according to Equation 5, wherein $v_{il}$ represents an estimated valuation of bidder i in auction l, and wherein $b_{il}$ represents the bid amount submitted by bidder i in auction l.

At step 180, it is determined whether all bids from the plurality of records have been accessed. In one embodiment, each bid of plurality of records is accessed for processing under steps 130-170. Provided there are bids that remain to be accessed, process 100 returns to step 120. Alternatively, provided all bids of the plurality of records have been accessed, process 100 proceeds to step 190.

Figure 3:
FIG. 3 is a diagram of an exemplary table of joint value distribution in accordance with one embodiment of the present invention.

At step 190, a joint valuation distribution comprising the valuations for the plurality of bidders for the plurality of auctions is generated. FIG. 3 is a diagram of an exemplary joint valuation distribution 300 in accordance with one embodiment of the present invention. Joint valuation distribution 300 is a table of valuations in a plurality of auctions (l) 210 for bidders (i) 220 as determined in process 100 of FIG. 1. It should be appreciated that joint valuation distribution 300 may comprise any number of auctions 210 (e.g., from 1 to L) and any number of bidders 220 (e.g., from 1 to n). However, joint valuation distribution is limited to the number of auctions and bidders from the corresponding joint bid distribution (e.g., joint bid distribution 200 of FIG. 2).

Valuation 330 represents a single valuation in accordance with one embodiment of the present invention. It should be appreciated that the valuations shown in joint valuation distribution 300 are exemplary. Furthermore, it should be appreciated that a joint valuation distribution 300 may be presented or received in another statistical format, such as a bar chart or scattergram.

Figure 4:
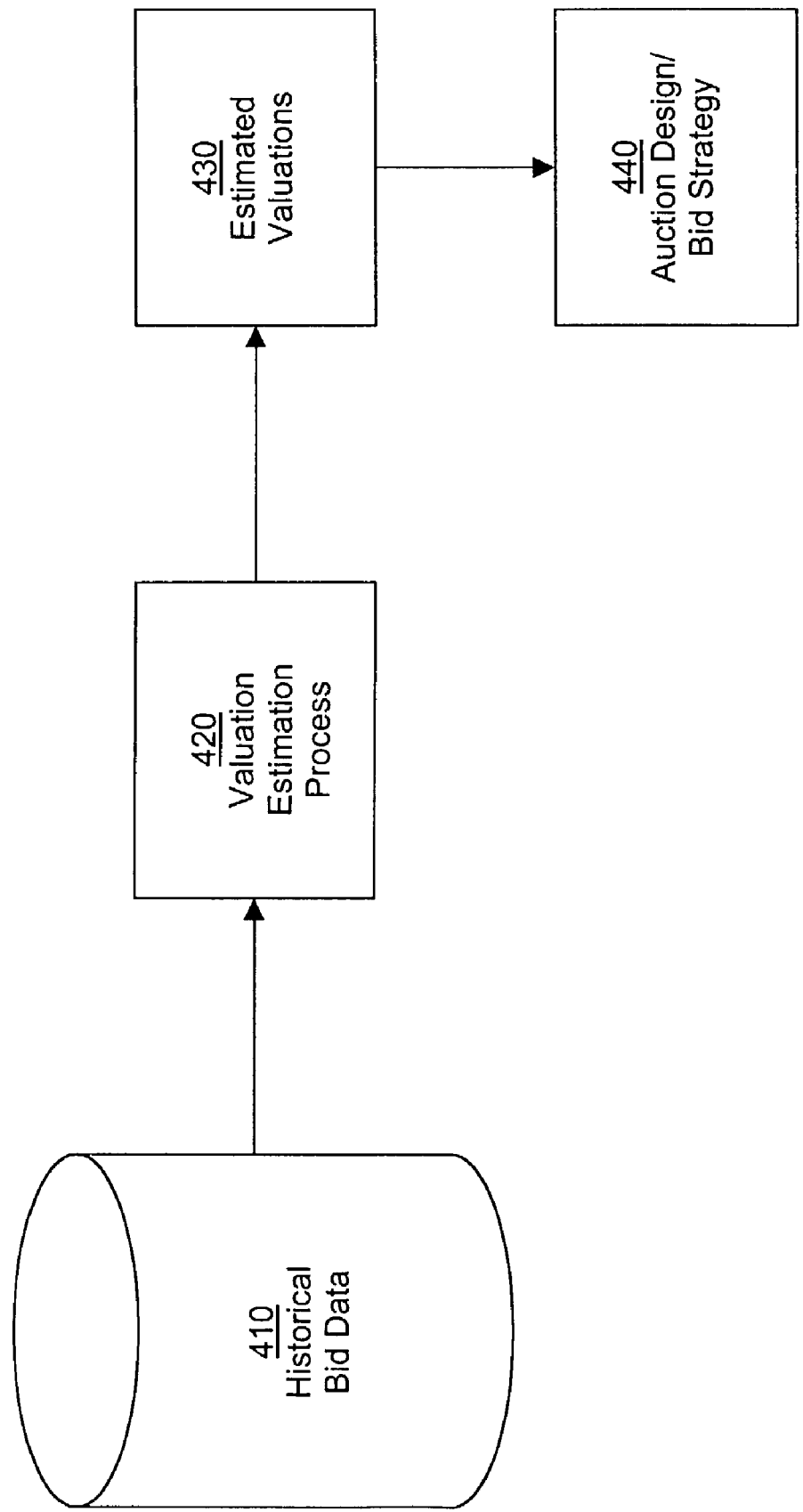
FIG. 4 is a data flow diagram illustrating a system for estimating bidder valuation in accordance with one embodiment of the present invention.

FIG. 4 is a data flow diagram 400 illustrating a data flow in a process for estimating valuation in accordance with one embodiment of the present invention. A joint bid distribution for historical bid data 410 is accessed. In one embodiment, historical bid data 410 comprises bid values for a plurality of auctions having a plurality of bidders. In one embodiment, historical bid data 410 is stored in a memory device of a computer system. In one embodiment, historical bid data 410 is stored in a database of a memory device of a computer system. It should be appreciated that historical bid data 410 can be stored in any format for storing data, and that the present invention is not limited to any one particular embodiment.

Historical bid data 410 is received at valuation estimation process 420. In one embodiment, the joint bid distribution is a table (e.g., joint bid distribution 200 of FIG. 2) comprising bids for a plurality of auctions having a plurality of bidders. It should be appreciated that a joint valuation distribution may be presented or received in another statistical format, such as a bar chart or scattergram.

At valuation estimation process 420, the bid values of historical bid data 410 are transformed into estimated valuations 430. In one embodiment, valuation estimation process 420 operates according to process 100 of FIG. 1. Estimated valuations 430 provide an indication of how a rival bidder shaded their valuation when placing their bid. In one embodiment, estimated valuations 430 are presented as a joint valuation distribution.

Estimated valuations 430 can be used to design an auction or devise a bid strategy at auction design/bid strategy 440. A joint valuation distribution is useful in auction design by aiding the auction designer in setting various auction parameters. For example, the joint valuation distribution is useful in helping to select an auction format, set a reserve price, deciding how many bidders to invite, as well as many other auction parameters. Furthermore, a joint value distribution is useful to a bidder in determining their bidding strategy when participating in an auction. By estimating the valuations of rival bidders, a bidder can determine its bid with greater confidence.

Embodiments of the present invention provide a method for estimating a bidder's valuation for an auctioned object based on historical bid data. The present invention does not require the use of broad assumptions, and is applicable to a wide range of auction environments with a high degree of reliability. Furthermore, the present invention is not data intensive, requiring relatively little historical bid data. Also, the present invention is applicable to both symmetric and asymmetric cases. In particular, embodiments of the present invention require only two-dimensional kernel estimation, regardless of the number of asymmetric rival bidders.

Various embodiments of the present invention, a computer-implemented method for estimating bidder valuation, are thus described. While the present invention has been described in particular embodiments, it should be appreciated that the present invention should not be construed as limited by such embodiments, but rather construed according to the below claims.

What is claimed is:

1. A computer-implemented method for estimating bidder valuation, said method comprising:

using a programmed electronic computer system, determining a probability that a bid of a first bidder in an auction is not greater than a first value, wherein a second bidder has a valuation in said auction equal to a second value, wherein said probability is determined using a one-dimensional kernel at said computer system;

determining a rate at which said probability changes, wherein said rate said probability changes is determined using a two-dimensional kernel at said computer system;

calculating ratio of said probability to said rate at which said probability changes at said computer system; and adding said ratio to said first bid to estimate a first bidder valuation at said computer system.

2. The method as recited in claim 1 wherein said probability is determined according to $$\hat{G}_{B_i,b_i}(B, b) = \frac{1}{L_n h_G} \sum_{l=1}^{L_n} 1(B_{i,l} \le B) K_G\left(\frac{b - b_{i,l}}{h_G}\right);$$

wherein said B comprises said first value;
wherein said b comprises said second value;
wherein said i comprises said first bidder;
wherein said l comprises said auction;
wherein said $L_n$ comprises a number of auctions comprising n first bidders;
wherein said $h_G$ comprises a first bandwidth; and
wherein said $K_G$ comprises said one-dimensional kernel.

3. The method as recited in claim 2 wherein said rate at which said probability changes is determined according to $$\hat{g}_{B_i,b_i}(B, b) = \frac{1}{L_n h_g^2} \sum_{l=1}^{L_n} K_g\left(\frac{B - B_{i,l}}{h_g}, \frac{b - b_{i,l}}{h_g}\right);$$

wherein said $h_g$ comprises a second bandwidth; and
wherein said $K_g$ comprises said two-dimensional kernel.

4. The method as recited in claim 3 wherein said ratio is determined according to $$\frac{\hat{G}_{B_i|b_i}(b|b)}{\hat{g}_{B_i|b_i}(b|b)}.$$

5. The method as recited in claim 4 wherein a first bidder valuation estimate is determined according to $$E_i(b) = b + \frac{\hat{G}_{B_i|b_i}(b|b)}{\hat{g}_{B_i|b_i}(b|b)};$$

wherein $E_i(b)$ comprises said first bidder valuation estimate.

6. The method as recited in claim 5 wherein said first bidder valuation is estimated according to $v_{il} = E_i(b_{il})$;
wherein said $v_{il}$ is said first bidder valuation.

7. The method as recited in claim 1 further comprising accessing a plurality of records corresponding to a plurality of auctions, wherein an auction of said plurality of auctions comprises a plurality of bids for a plurality of first bidders.

8. The method as recited in claim 7 further comprising repeating said method for said plurality of bids for said plurality of auctions.

9. The method as recited in claim 8 further comprising generating a joint valuation distribution comprising said first bidder valuations for said plurality of first bidders for said plurality of auctions.

10. The method as recited in claim 1 wherein said rate of change is a derivative of said probability.

11. A computer-readable non-transitory tangible storage medium having computer-executable program code embodied therein for causing a computer system to perform a method for estimating bid valuation, said method comprising:
    accessing a plurality of records corresponding to a plurality of auctions, wherein an auction of said plurality of auctions comprises a plurality of bids for a plurality of first bidders;
    determining a probability that a bid of said plurality of bids in an auction is not greater than a first value, wherein a second bidder has a valuation in said auction equal to a second value, wherein said probability is determined using a one-dimensional kernel;
    determining a derivative of said probability, wherein said derivative is determined using a two-dimensional kernel;
    calculating ratio of said probability to said derivative of said probability; and
    adding said ratio to said rival bid to estimate a first bidder valuation.

12. The computer-readable non-transitory tangible storage medium as recited in claim 11 wherein said probability is determined according to $$\hat{G}_{B_i,b_i}(B, b) = \frac{1}{L_n h_G} \sum_{l=1}^{L_n} 1(B_{i,l} \leq B) K_G\left(\frac{b - b_{i,l}}{h_G}\right);$$

wherein said B comprises said first value;
wherein said b comprises said second value;
wherein said i comprises said first bidder;
wherein said l comprises said auction;
wherein said $L_n$ comprises a number of auctions comprising n first bidders;
wherein said $h_G$ comprises a first bandwidth; and
wherein said $K_G$ comprises said one-dimensional kernel.

13. The computer-readable non-transitory tangible storage medium as recited in claim 12 wherein said derivative is determined according to $$\hat{g}_{B_i,b_i}(B, b) = \frac{1}{L_n h_g^2} \sum_{l=1}^{L_n} K_g\left(\frac{B - B_{i,l}}{h_g}, \frac{b - b_{i,l}}{h_g}\right);$$

wherein said $h_g$ comprises a second bandwidth; and
wherein said $K_g$ comprises said two-dimensional kernel.

14. The computer-readable non-transitory tangible storage medium as recited in claim 13 wherein said ratio is determined according to $$\frac{\hat{G}_{B_i|b_i}(b|b)}{\hat{g}_{B_i|b_i}(b|b)}.$$

15. The computer-readable non-transitory tangible storage medium as recited in claim 14 wherein a first bidder valuation estimate is determined according to $$E_i(b) = b + \frac{\hat{G}_{B_i|b_i}(b|b)}{\hat{g}_{B_i|b_i}(b|b)};$$

wherein $E_i(b)$ comprises said first bidder valuation estimate.

16. The computer-readable non-transitory tangible storage medium as recited in claim 15 wherein said first bidder valuation is determined according to $v_{il} = E_i(b_{il})$;
wherein said $v_{il}$ is said first bidder valuation.

17. The computer-readable non-transitory tangible storage medium as recited in claim 11 further comprising repeating said method for said plurality of bids.

18. The computer-readable non-transitory tangible storage medium as recited in claim 17 further comprising generating a joint valuation distribution comprising said first bidder valuations for said plurality of first bidders for said plurality of auctions.

19. A computer-readable non-transitory tangible storage medium having computer-executable program code embodied therein for causing a computer system to perform bidder valuation estimation, said computer readable code comprising:
    code for determining a probability that a bid of a first bidder in an auction is not greater than a first value, wherein a second bidder has a valuation in said auction equal to a second value, wherein said probability is determined using a one-dimensional kernel;

code for determining a rate at which said probability changes, wherein said rate at which said probability changes is determined using a two-dimensional kernel;

code for calculating ratio of said probability to said rate of changes; and code for adding said ratio to said first bid to estimate a first bidder valuation.

20. The computer-readable non-transitory tangible storage medium as recited in claim 19 further comprising code for accessing a plurality of records corresponding to a plurality of auctions, wherein an auction of said plurality of auctions comprises a plurality of bids for a plurality of first bidders.

21. The computer-readable non-transitory tangible storage medium as recited in claim 20 further comprising code for estimating said first bidder valuations for said plurality of bids for said plurality of auctions.

22. The computer-readable non-transitory tangible storage medium as recited in claim 21 further comprising code for generating a joint valuation distribution comprising said first bidder valuations for said plurality of first bidders for said plurality of auctions.

23. The computer-readable non-transitory tangible storage medium as recited in claim 19 wherein said rate is a derivative of said probability.

\* \* \* \* \*